United States Patent [19]
Yamazaki

[11] Patent Number: 5,403,194
[45] Date of Patent: Apr. 4, 1995

[54] ELASTIC INTERCONNECTOR

[75] Inventor: Kouichi Yamazaki, Nagano, Japan

[73] Assignee: Shin-Etsu Polymer Co., Ltd., Tokyo, Japan

[21] Appl. No.: 91,328

[22] Filed: Jul. 14, 1993

[30] Foreign Application Priority Data

Jul. 17, 1992 [JP] Japan .................................. 4-213372

[51] Int. Cl.⁶ .............................................. H01R 9/09
[52] U.S. Cl. ...................................... 439/66; 439/591
[58] Field of Search .......................... 439/66, 91, 591

[56] References Cited

U.S. PATENT DOCUMENTS

| | | | |
|---|---|---|---|
| 3,795,037 | 3/1974 | Luttmer | 439/591 X |
| 4,402,562 | 9/1983 | Sado | 439/91 |
| 4,520,562 | 4/1985 | Sado et al. | 439/91 X |
| 5,101,553 | 4/1992 | Carey | 439/91 X |

FOREIGN PATENT DOCUMENTS

| | | |
|---|---|---|
| 0242303 | 4/1987 | European Pat. Off. . |
| 1341037 | 5/1970 | United Kingdom . |
| 1368578 | 1/1972 | United Kingdom . |
| 1587416 | 9/1977 | United Kingdom . |
| 2054284 | 6/1980 | United Kingdom ................ 439/66 |

*Primary Examiner*—Z. R. Bilinsky
*Attorney, Agent, or Firm*—McAulay Fisher Nissen Goldberg & Kiel

[57] ABSTRACT

An improved elastic interconnector is proposed which consists of, different from conventional rubber-made interconnectors having a structure of alternate stratification of insulating rubber layers and electroconductive rubber layers, an insulating block made from a silicone rubber and a plural number of gold-plated fine metal wires embedded therein in a parallel alignment, each end portion of the metallic wires being protruded out of the surface of the insulating rubber block to ensure reliable contacting with electrode terminals.

7 Claims, 5 Drawing Sheets

I: •— 50mA/wire  II: ■— 60mA/wire
III: ♦— 70mA/wire  IV: *— 80mA/wire
V: ○— 90mA/wire  VI: ◇— 100mA/wire

FIG. 8

ELASTIC INTERCONNECTOR

BACKGROUND OF THE INVENTION

The present invention relates to an elastic interconnector, referred to simply as a connector hereinafter, or, more particularly, to a connector used for making electrical connection between two arrays of electrode terminals on two oppositely facing electronic devices such as printed circuit boards and the like irrespective of the types of the electronic circuits involved Which may be an analogue circuit or a digital circuit.

Connectors of one of the most widely used types are those formed by alternately stratifying each a plural number of layers of an electrically insulating rubbery material and layers of an electrically conductive rubbery material. A most conventional rubbery material for these insulating and conductive rubbery layers is a silicone rubber by virtue of the excellent electrical properties including good insulation while an electroconductive silicone rubber is obtained by compounding a silicone rubber with a large amount of fine particles of a conductive material such as carbon and metals. One of the problems in such a silicone rubber-based electroconductive rubbery material is that the volume resistivity of such a conductive rubbery material cannot rarely be low enough and it is a rather difficult matter that the electrically conductive rubbery layer formed from a silicone rubber-based conductive rubbery material has an electric resistance lower than 1 k Ω with good reproducibility. Therefore, silicone rubber-based connectors of the above mentioned type are not always suitable for the connection of analogue or digital electronic circuits in which a considerably large electric current passes through the conductive layers of the connector and high accuracy is required for the resistance thereof if not to mention the relatively high costs of such connectors.

When carbon black is used as the conductivity-imparting particulate material dispersed in the matrix of a silicone rubber to prepare a conductive silicone rubber, in particular, the volume resistivity of the conductive silicone rubber material usually exceeds 0.2 Ω.cm so that connectors prepared by using such a conductive silicone rubber cannot be used for the connection of analogue circuits and high-frequency digital circuits. Another problem in carbon black-loaded conductive silicone rubber materials is that, when the volume resistivity of the rubber is desired not to exceed 0.4 Ω.cm, the loading amount of carbon black must be so high that the carbon black-loaded silicone rubber has an increased hardness and is poor in the rubbery elasticity to exhibit a higher than adequate compressive stress under compression when the connector is in service and hence the rubbery connector made from such a high-hardness rubber is not suitable for use under compression in order to ensure reliability of the electric contacting between the electrode terminals and the conductive rubber layers of the connector. Further, the electric current passing through a conductive silicone rubber layer cannot be larger than 1 mA because of the temperature elevation sometimes to exceed 50° C. due to the high resistivity of the conductive layer. This problem due to the high compressive stress cannot be solved by using a metallic powder as the conductivity-imparting agent. In addition, the reliability of electric conduction through such an electroconductive rubber is relatively low under repeated use by compression because the electric conduction therethrough is obtained by the direct contacting between the metallic particles dispersed in the rubbery matrix.

SUMMARY OF THE INVENTION

The present invention accordingly has an object to provide a novel and improved elastic connector free from the above described problems and disadvantages in the prior art connectors.

Thus, the novel elastic interconnector of the invention consists of a block made from an electrically insulating rubbery material forming a matrix phase and a plural number of fine metallic wires in a substantially parallel alignment, of which at least the surface layer is formed from gold or a gold-based alloy, embedded in the matrix of the electrically insulating rubbery material, each end of the fine metallic wires making appearance on the surface of the block.

DETAILED DESCRIPTION OF THE PREFERRED EMBODIMENTS

As is described above, the most characteristic feature of the inventive connector consists in the use of fine metallic wires having a plating layer of gold or a gold-based alloy to form the electroconductive parts of the connector in place of the conventional electroconductive silicone rubber layers. By virtue of the very low volume resistivity of metallic wires as compared with a carbon black-loaded or metal powder-loaded silicone rubber, the volume resistivity of the electroconductive part, i.e. metallic wires, can be as low as 0.1 Ω.cm or even lower so that no significant temperature elevation is caused even when the electric current passing through the conductive part of the connector is 100 mA or even larger. In addition, the compressive stress in the inventive connector under compression is never unduly large so that the inventive connector is suitable for use in connection by compression. Accordingly, the inventive connector can be used in any electronic circuits irrespective of the types thereof, which may be analogue or digital, with high reliability of electric connection since electric connection is established by the resilient contacting of the respective end portions of the fine metal wires to the electrode terminals.

As is described above, the inventive connector consists of a block of an electrically insulating rubbery elastomer forming the matrix and a substantially parallel alignment of fine metal wires having a plating layer of gold or a gold-based alloy and embedded in the matrix of the insulating rubber. The metallic material forming the fine metal wires is not particularly limitative provided that the volume resistivity thereof is low enough including copper, nickel and the like. Brass is sometimes preferred in respect of the relatively low stress under compressive force on the connector. The diameter of each of the metal wires is preferably in the range from 20 $\mu$m to 70 $\mu$m or, more preferably, from 20 $\mu$m to 50 $\mu$m. The metal wires should have a tensile strength of 60 g to 140 g per wire. When the strength of the individual wires is too low, no protrusion of the end portions of the metal wires can be obtained by cutting to prepare unit connectors while, when the strength is too large, bending of the protruded end portions of the metal wires toward the surface of the insulating block by cutting cannot be obtained. In this regard, wires of pure gold and tungsten are not suitable for the purpose due to their too low and too high strengths, respectively. It is preferable to use wires having a plating layer of gold or a gold-based alloy, for example, with cobalt, palladium and the like or, preferably, cobalt on a suitable base wire having an appropriate tensile strength. The thickness of the plating layer is in the range from 0.05 $\mu$m to 1.0 $\mu$m or, preferably, from 0.05 $\mu$m to 0.3 $\mu$m. Silicone rubbers having a rubber hardness of 40° to 60° H and a tear strength of 30 to 50 kgf/cm are used preferably as the insulating rubbery material.

Figure 1A:
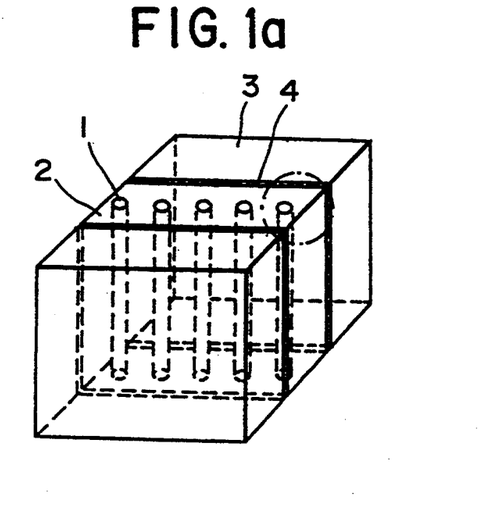
FIG. 1a is a schematic perspective view of the inventive connector and FIG. 1b is a partial enlargement thereof showing the end portion of a metallic wire by a cross sectional view.
Figure 1B:
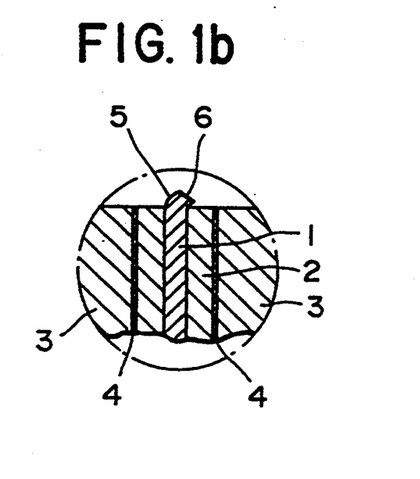
Figure 1C:
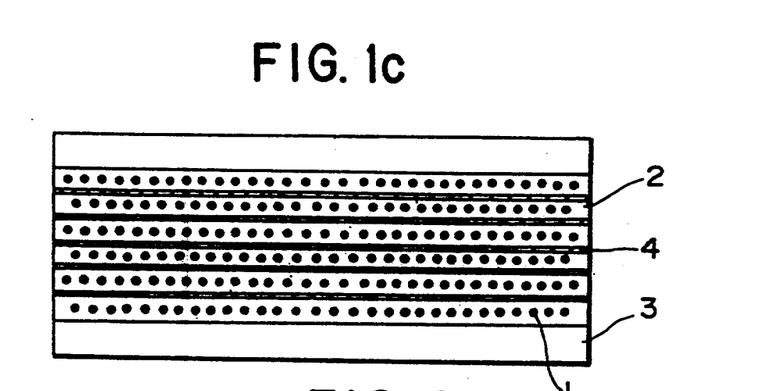
FIG. 1c schematically illustrates an end surface of the inventive connector having a plural number of the layers each embedding an array of the fine metal wires.

FIG. 1a schematically illustrates a connector according the invention by a perspective view, in which a plural number of fine metal wires 1,1, ... aligned substantially in parallel to each other with an appropriate pitch are embedded in the block 2 of an insulating rubbery material as a matrix. Though not essential, a supporting block 3 of a rubbery material having a hardness of 20° H to 50° H is adhesively bonded with an adhesive layer 4 to each side surface of the connector block 2. Although each of the fine metal wires 1 in FIG. 1a is aligned perpendicularly to the upper and lower surfaces of the insulating matrix block 2, it is optional that the fine metal wires 1 are inclined relative to the upper and lower surfaces of the matrix block 2. This embodiment is preferred in respect of a decrease in the compressive stress, especially, at the initial stage of compression and stabilization of contacting between the metal wires 1 and the electrode terminals. FIG. 1b illustrates the end portion of a fine metal wire encircled in FIG. 1a by a cross sectional view perpendicular to the array of the fine metal wires 1. As is shown in this figure, it is preferable in order to ensure reliability of electric contact between the fine metal wires 1 and the electrode terminals (not shown in the figure) coming into contact with each other that the end portion 6 of the fine metal wire 1 is protruded out of the surface of the insulating block 2 and the protruded portion 6 of the fine metal wire 1 is bent toward the insulating block 2 so that the gold-plated side surface 5 of the metal wire 1 faces the electrode terminal to which the wire 1 is contacted.

Figure 2:
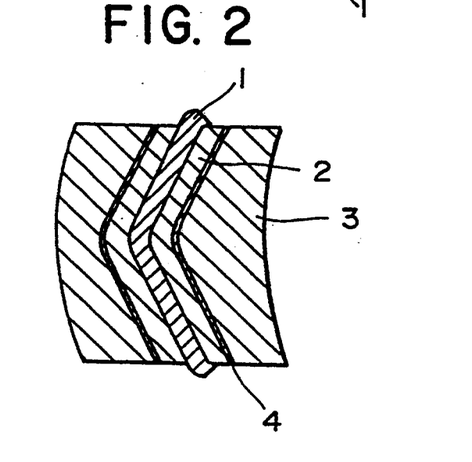
FIG. 2 is a cross sectional view of another embodiment; of the inventive connector in which each metallic wire is bent in a dog-legged form.

It is preferable that, in order to further decrease the compressive stress of the inventive connector in a compressed state for connection, as is illustrated in FIG. 2 by a cross sectional view, each of the fine metal wires 1 is bent at the middle point in a dog-legged form or, though not shown in the figure, curved in an arc-like form. In this case, it is desirable that the fine metal wires 1 and the insulating rubbery matrix 2 are adhesively bonded together in order to ensure reliable holding of the fine metal wires 1 by the insulating matrix 2. The strength of such adhesive bonding between the metal wires 1 and the insulating matrix 2 can be improved by the admixture of the silicone rubber composition with a silane coupling agent which is an organosilane compound having an epoxy group and a silanolic hydroxy group in a molecule, or by the treatment of the metal wires beforehand with a primer composition.

As is illustrated in FIGS. 1a to 1c and 2, it is advantageous that the inventive connector is provided on both sides of the insulating block 2 each with a supporting block 3 adhesively bonded thereto by means of an adhesive layer 4 for the purpose of protection. A preferable material for the supporting block 3 is a silicone rubber having a hardness of 40° H to 60° H and a tear strength of 30 to 50 kgf/cm so that the resilient contacting of each metal wire 1 to the electrode terminal could be more reliable. The adhesive 4 to adhesively bond the insulating block 2 and the supporting blocks 3 together is not particularly limitative but it is preferably a silicone-base adhesive curable at room temperature by the mechanism of the addition reaction or the so-called hydrosilation reaction.

Figures 3A, 3B:
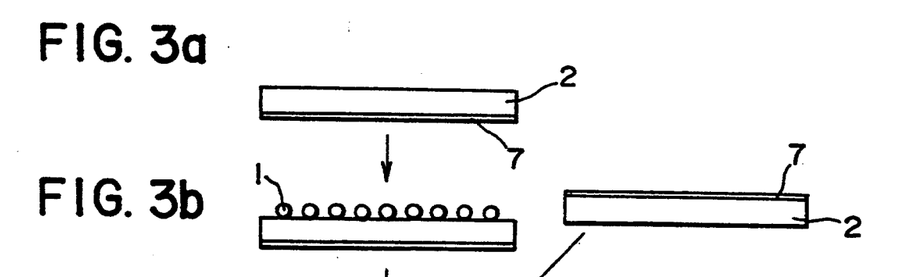
FIGS. 3a to 3f each schematically illustrate a step of the preparation procedure of the inventive connector by a cross sectional view.

FIGS. 3a to 3f each illustrate one of the steps in the process for the preparation of the inventive connector by a cross section. As is illustrated in FIG. 3a, in the first place, a layer 2 of an insulating rubbery material such as an unvulcanized silicone rubber composition having an appropriate thickness is sheeted on a continuous-length base film 7 of a suitable plastic resin such as a polyester. The base film 7 has a thickness of, for example, 25 to 125 $\mu$m and the film 7 is preferably of a low-shrinkage type to exhibit thermal shrinkage not exceeding 0.5%. It is sometimes advantageous that the base film 7 is provided with a grained pattern of the surface having a roughness $R_a$ of 0.2 to 0.8 so as to ensure increased smoothness of sheeting of the silicone rubber layer 2 thereon. It is desirable that the surface of the base film 7 is treated or coated in advance with a surface-releasing agent, which can be a surface active agent, so as to facilitate peeling of the base film 7 from the silicone rubber layer 2 in the subsequent step.

Figure 3C:
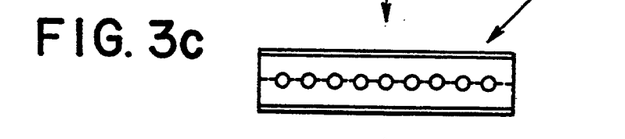

In the second step, as is illustrated in FIG. 3b, a plural number of continuous-length fine metal wires 1 are arranged on the surface of the thus sheeted insulating silicone rubber layer 2 in a substantially parallel alignment at an appropriate pitch and then another silicone rubber layer 2 sheeted on and carried by another base film 7 separately prepared beforehand is laid on the array of the metal wires 1 as is illustrated in FIG. 3c so that each of the metal wires 1 is sandwiched by the two layers 2 of the insulating silicone rubber. After deaeration from the space between the two silicone rubber layers 2, they are subjected to curing by heating at a temperature of 110° to 150° C. for 15 to 30 minutes under an appropriate pressure so that they are converted into an integral cured silicone rubber block 2 in which the fine metal wires 1 in an alignment are embedded. The next step is to remove the base films 7,7 from the surfaces of the cured silicone rubber block 2 to give a connector of the invention illustrated in FIG. 3d. It is readily understood that, when each of the fine metal wires 1 embedded in the insulating block 2 of a finished connector has a dog-legged configuration as is illustrated in FIG. 2, the metal wires 1 arranged on the insulating silicone rubber layer 2 in the second step is bent in a zigzag form instead of a straight form at such a pitch as to conform with the thickness of the finished connectors.

Figures 3D, 3E:
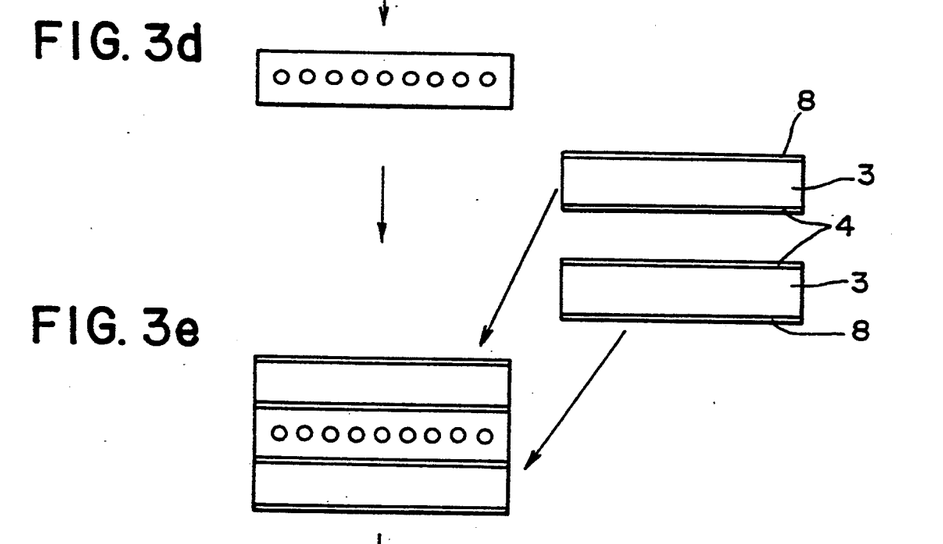
Figure 3F:
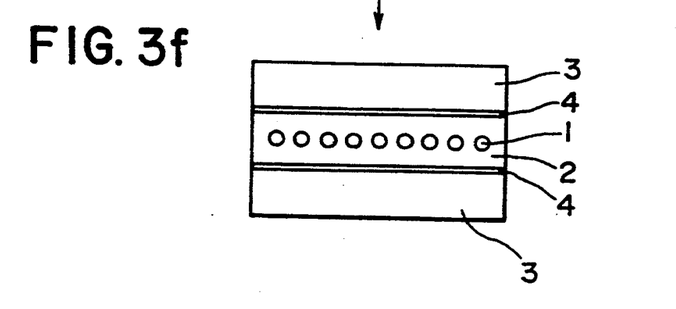

If desired, the thus prepared inventive connector is provided on both surfaces of the insulating silicone rubber block 2 each with a supporting block 3. As is illustrated in FIG. 3e, two silicone rubber layers 3,3 having a rubber hardness of 40° to 68° H each bonded to and supported on a base film 8 of, for example, a polyester resin and coated with an adhesive 4 on the other surface are bonded to the respective surfaces of the connector with the adhesive layer 4 intervening therebetween and they are heated together at a temperature of 130° to 150° C. for 3 to 6 minutes under a pressure of about 10 kgf/cm² so as to complete curing of the adhesive 4 followed by peeling of the base films 8,8 to complete the protected connector with supporting blocks 3,3 as is illustrated in FIG. 3f and post-curing of the insulating silicone rubber layer 2 by heating at a temperature of 180° to 250° C. for 1 to 2 hours.

Figure 4A:
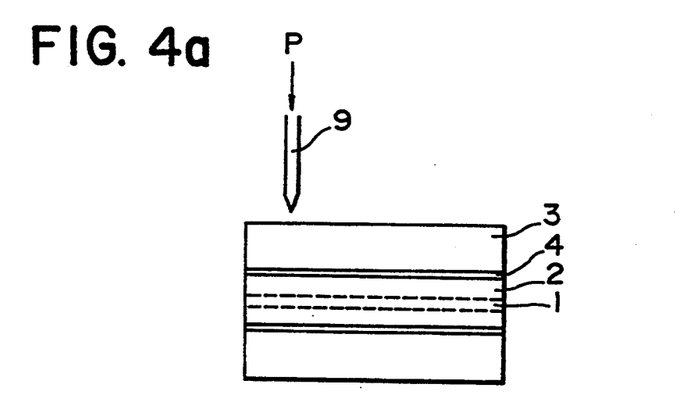
FIGS. 4a to 4c each illustrate a step of cutting of the connector by using a cutting blade by a side view.
Figure 4B:
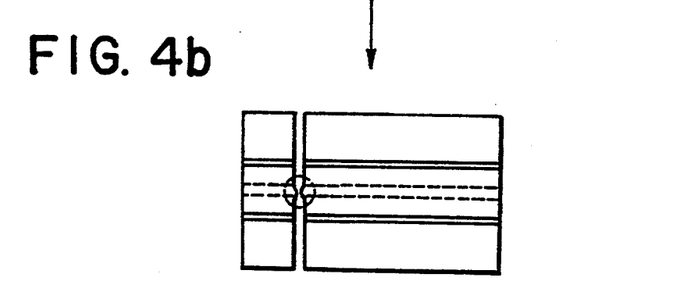
Figure 4C:
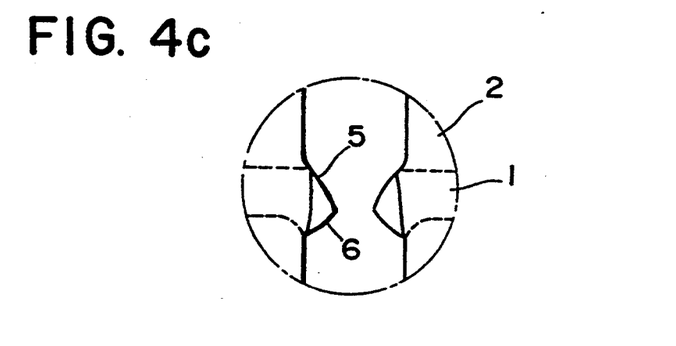

When the connector prepared in the above described manner has a continuous length, it must be cut into pieces having an appropriate length or thickness suitable for intervention between two arrays of electrode terminals on the oppositely facing circuit boards and the like. This cutting process is carried out in a manner illustrated in FIGS. 4a to 4c. As is illustrated in FIG. 4a by a side view, a punching blade 9 is thrusted into the connector under an appropriate pressing force P in a direction perpendicular to the fine metal wires 1 so that the continuous-length connector is cut piece by piece into unit connectors each having an appropriate thickness as is illustrated in FIG. 4b by a side view. When this cutting process is carried out under appropriate conditions, the end portion 5 of each metal wire 1 is, as is illustrated in FIG. 4c by a side view, which is an enlargement of the encircled portion in FIG. 4b, protruded out of the surface of the insulating silicone rubber block 2. In order that the end portion Of each of the fine metal wires 1 makes appearance by forming a protrusion of 10 to 40 μm length on the surface of the insulating matrix block and the protruded end portion of each metal wire is bent toward the surface of the block 2 by the cutting work as described above, it is desirable that the adhesive bonding strength between each time metal wire 1 and the insulating rubbery matrix 2 is in the range from 30 g to 50 g per wire. When this adhesive bonding strength is too small, separation of the metal wire 1 from the rubbery matrix 2 may eventually be caused so that the cutting work cannot be continued while, when the adhesive bonding strength is too large, protrusion of the end portion of the metal wire 1 as cut cannot be obtained.

In the following, the connector of the invention is illustrated in more detail by way of an example, in which the term of "parts" always refers to "parts by weight".

EXAMPLE

An electrically insulating, curable silicone rubber composition was prepared by uniformly blending 100 parts of a silicone rubber compound (KE 153U, a product by Shin-Etsu Chemical Co.) capable of giving a cured silicone rubber of 50° H hardness with 0.5 part and 2.5 parts of curing agents recommended by the manufacturer (C-19A and C-19B, respectively, each a product by the same company, supra) and 1.0 part of a silane coupling agent (KBM-403, a product by the same company, supra). This silicone rubber composition was sheeted in a thickness of 0.1 mm on a base film of a polyester resin having a thickness of 50 μm and exhibiting thermal shrinkage of 0.5%, of which one of the surfaces had been sandblasted to have a surface roughness $R_a$ of 0.8 and coated with a surface active agent.

A plural number of brass wires each having a diameter of 40 μm and plated with a gold-cobalt alloy in a thickness of 0.4 μm were arranged on the surface of the above obtained silicone rubber layer in parallel with each other at a pitch of 100 μm. Another silicone rubber sheet carried by a polyester base film prepared in the same manner as above .was laid on the array of the metal wires to give a laminate sandwiching the array of the metal wires. The laminate was subjected to aging for 8 minutes under a pressure of 6 kgf/cm² and then curing by heating at 120° C. for 15 minutes followed by removal of the polyester base films by peeling.

Separately, a silicone rubber sheet having a hardness of 35° H prepared from a liquid silicone rubber composition (KE 1983BL A/B, a product by the same company, supra) was lined with a polyester film having a thickness of 100 μm and exhibiting thermal shrinkage of 3% followed by heating at 130° C. for 30 seconds to form an integral laminate having an overall thickness of 1.0 mm. The surface of the silicone rubber sheet carried by the polyester base film was coated by screen printing with a room temperature-curable silicone-based adhesive curable by the mechanism of the addition reaction (KF 1800TA, a product-by the same company, supra) in a coating thickness of 30 μm and applied and bonded to each surface of the above prepared connector and, after deaeration by reducing the pressure, they were integrated by heating at 130° C. for 60 seconds followed by removal of the polyester films and post-curing at 180° C. for 2 hours.

The above prepared continuous-length connector sheet having an overall thickness of 2.2 mm provided with two supporting blocks was cut by using a 0.3 mm thick cutter blade made of a SKS-7 steel of which the edge angle was 18°, into pieces of 2.6 mm height in the direction of the aligned metal wires and 50 mm length in the direction perpendicular to the aligned metal wires.

Figure 5:
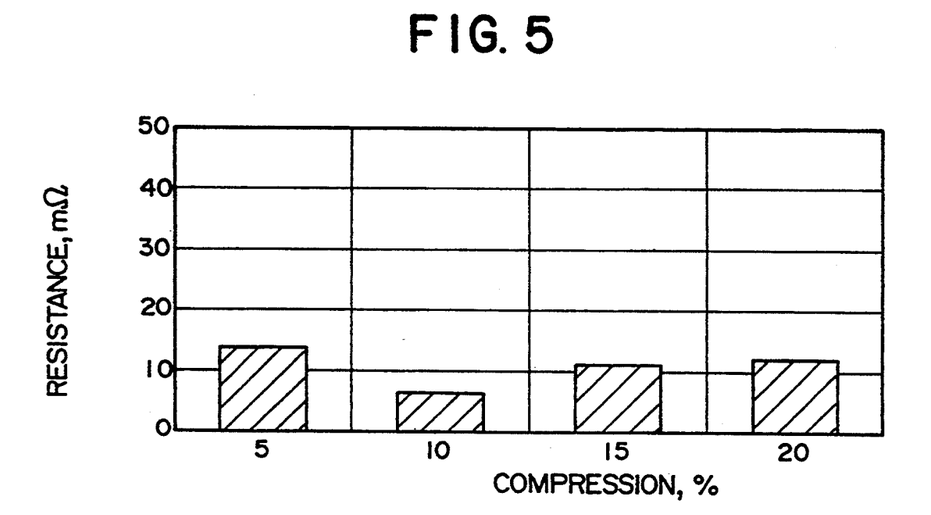
FIG. 5 is a graph showing the electric resistance of the conductive part in the connector prepared in the Example as a function of % compression.
Figure 6:
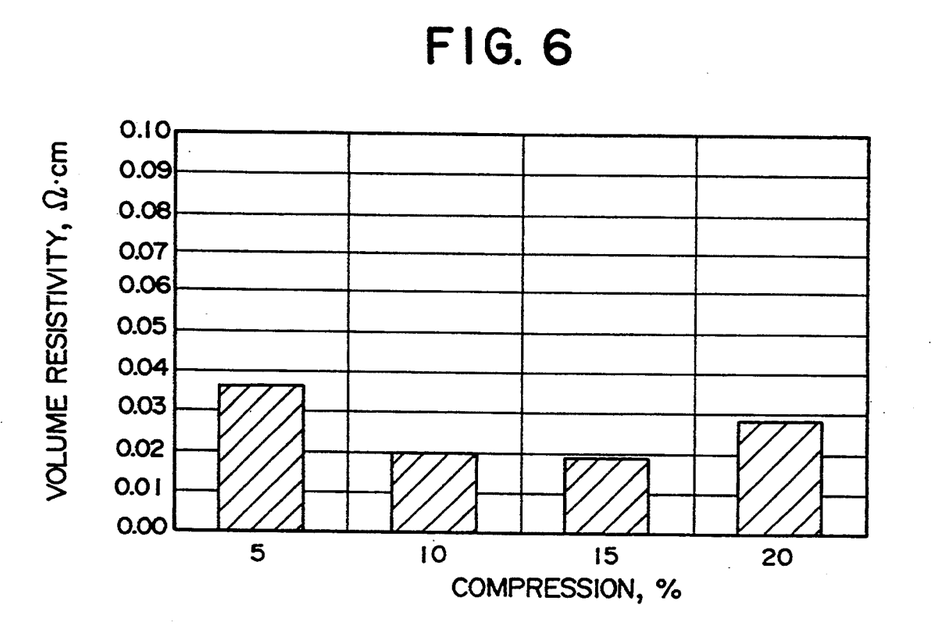
FIG. 6 is a graph showing the volume resistivity of the conductive part as a function of % compression calculated from the data given in FIG. 5.

The thus obtained connector with the supporting blocks was brought into press-contacting with gold-plated electrodes of 1.0 mm width and the electric resistance thereof was measured by the four-line method to give the results shown in FIG. 5 which gives the values of the resistance in mΩ as a function of % compression. Further, the values of the electric resistance shown in FIG. 5 were converted into volume resistivity by calculation to give the results shown in FIG. 6 which gives the volume resistivity in Ω.cm as a function of % compression.

Figure 7:
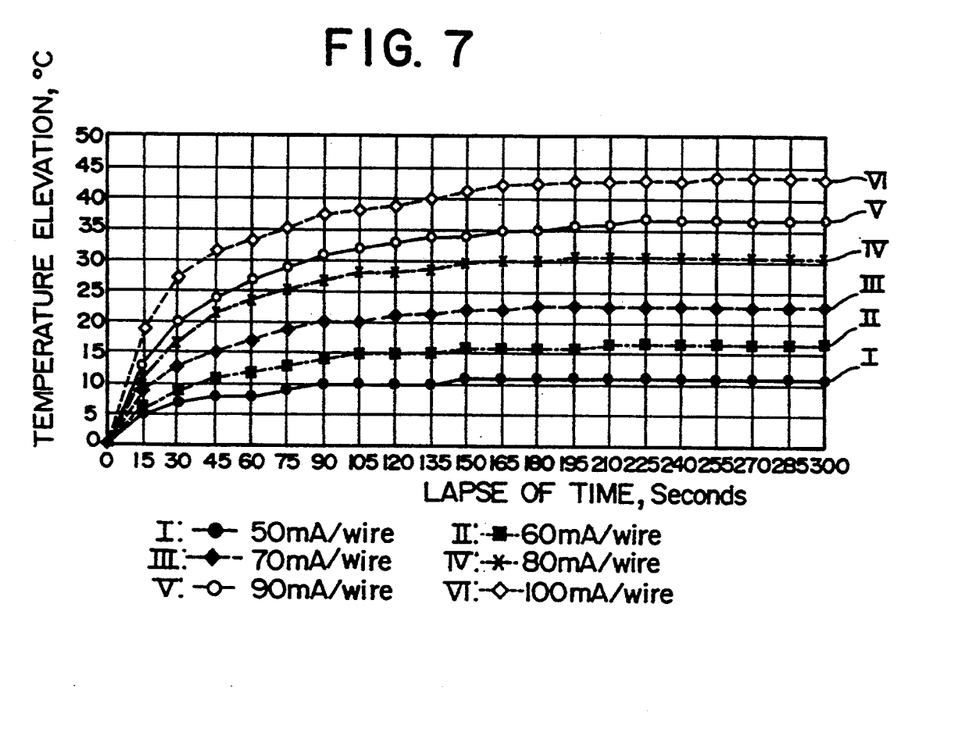
FIG. 7 is a graph showing the temperature elevation of the connector prepared in the Example when an electric current was passed through the metallic wire as a function of the lapsed time in seconds with the electric current per wire as a parameter.
Figure 8:
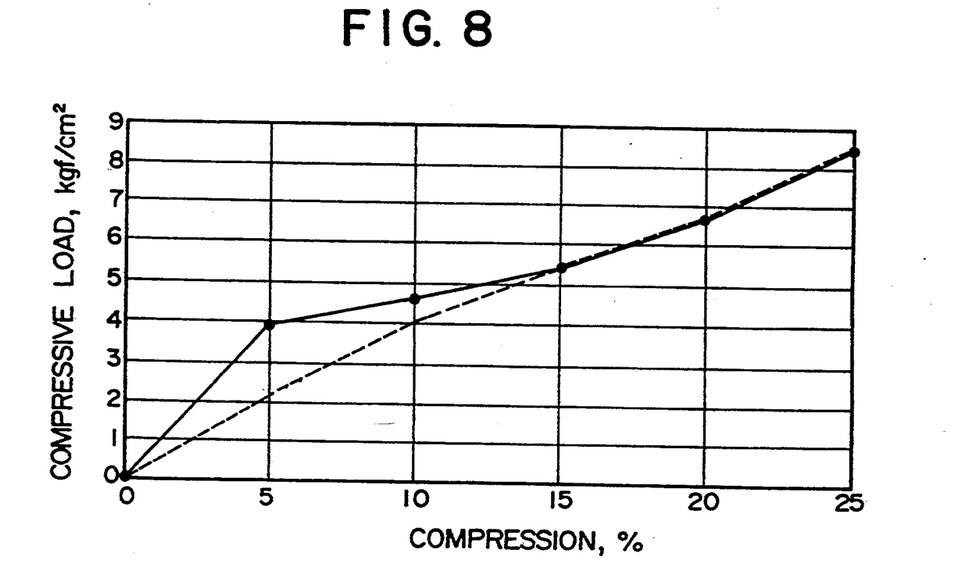
FIG. 8 is a graph showing the relationship between the compressive load per unit area and % compression in the connector prepared in the Example.

Further, a varied electric current of 50 to 100 mA was passed through the connector and the elevation in the temperature was measured in the lapse of time to give the results shown in FIG. 7 as a function of the lapsed time in seconds for each value of the electric current. FIG. 8 shows the relationship in this connector between the compressive load and the % compression when compression is effected at a rate of 1.0 mm/minute. The solid line and the broken line in FIG. 8 show the results obtained with connectors in which the fine metal wires were aligned perpendicularly and making an angle of 45°, respectively.

What is claimed is:

1. An elastic interconnector which is an integral body consisting of a block made from an electrically insulating rubbery material forming a matrix phase and a plural number of fine metal wires in a substantially parallel alignment, of which at least the surface layer is formed from gold or a gold-based alloy, embedded in the matrix of the electrically insulating rubbery material, a 10 to 40 mm end portiion of each of the fine metal wires protruding from the opposite parallel surface of the insulating block, the protruding portion being bent toward the surface of the insulating block.

2. The elastic interconnector as claimed in claim 1 of which the compressive stress is in the range from 5 to 15 kgf/cm$^2$ in the direction perpendicular to the opposite parallel surfaces.

3. The elastic interconnector as claimed in claim 1 in which the metal wires each have a diameter in the range from 20 to 50 μm.

4. The elastic interconnector as claimed in claim 1 in which the electrically insulating rubbery material is a silicone rubber.

5. The elastic interconnector as claimed in claim 1 in which each of the metal wires embedded in the insulating block has a dog-legged configuration.

6. The elastic interconnector as claimed in claim 1 in which the compressive stress under 15% compression is in the range from 5 to 15 kgf/cm$^2$ in the direction perpendicular to the parallel opposite surfaces.

7. The elastic interconnector as claimed in claim 1 in which the electrically insulating rubbery material is a silicone rubber having a rubber hardness of 40° to 60° H and a tear strength of 30 to 50 kgf/cm.

* * * * *

UNITED STATES PATENT AND TRADEMARK OFFICE
CERTIFICATE OF CORRECTION

PATENT NO. : 5,403,194
DATED : April 4, 1995
INVENTOR(S) : Kouichi Yamazaki

It is certified that error appears in the above-indentified patent and that said Letters Patent is hereby corrected as shown below:

Column 7, line 18, change "mm" to --$\mu$m--, and change "portiion" to --portion--.

Signed and Sealed this

Twenty-third Day of April, 1996

Attest:

BRUCE LEHMAN

Attesting Officer     Commissioner of Patents and Trademarks